US007847790B2

(12) United States Patent
Bewley et al.

(10) Patent No.: US 7,847,790 B2
(45) Date of Patent: Dec. 7, 2010

(54) INTERACTIVE TOUCHPAD

(75) Inventors: Wilbur Bewley, Nicholasville, KY (US);
Landrum Haddix, Berea, KY (US);
Sallie Tabb, Lexington, KY (US); David Moore, Lexington, KY (US); Richard B. Gratz, Lexington, KY (US); Brent Ross, Georgetown, KY (US); James Bensing, Georgetown, KY (US);
Matthew Shipman, Lexington, KY (US); Marshall White, Lexington, KY (US); David Frysinger, Lexington, KY (US)

(73) Assignee: Elan Home Systems, Lexington, KY (US)

( * ) Notice: Subject to any disclaimer, the term of this patent is extended or adjusted under 35 U.S.C. 154(b) by 693 days.

(21) Appl. No.: 11/840,135

(22) Filed: Aug. 16, 2007

(65) Prior Publication Data

US 2008/0055265 A1     Mar. 6, 2008

Related U.S. Application Data

(60) Provisional application No. 60/823,996, filed on Aug. 30, 2006.

(51) Int. Cl.
*G06F 3/041* (2006.01)
(52) U.S. Cl. .................... 345/173; 345/102; 345/175
(58) Field of Classification Search ......... 345/172–175, 345/102, 207; 340/545.3; 174/66; 348/734; 398/132, 140, 160
See application file for complete search history.

(56) References Cited

U.S. PATENT DOCUMENTS

| 5,640,296 | A  | * | 6/1997  | Bonsall et al. ......... 361/679.27 |
| 6,579,237 | B1 | * | 6/2003  | Knoblich ................... 600/437 |
| 6,686,908 | B1 | * | 2/2004  | Kobayashi ................. 345/173 |
| 7,394,367 | B1 | * | 7/2008  | Aupperle et al. ............ 340/540 |
| 2005/0030518 | A1 | * | 2/2005  | Nishi et al. ................ 356/3.04 |
| 2005/0090206 | A1 | * | 4/2005  | Hyun et al. ................ 455/90.3 |
| 2005/0261060 | A1 | * | 11/2005 | Nguyen et al. ............... 463/40 |
| 2005/0269196 | A1 | * | 12/2005 | Brown et al. ................ 200/502 |
| 2005/0280636 | A1 | * | 12/2005 | Hildebrandt et al. ........ 345/173 |
| 2006/0124920 | A1 | * | 6/2006  | Kimura ....................... 257/40 |
| 2007/0279369 | A1 | * | 12/2007 | Yao et al. .................... 345/102 |

* cited by examiner

*Primary Examiner*—Amare Mengistu
*Assistant Examiner*—Hong Zhou
(74) *Attorney, Agent, or Firm*—DLA Piper LLP (US)

(57) ABSTRACT

A film interactive touchpad for control of home systems. A touchscreen defined by a glass panel and polyester film defines active areas responsive to contact. Multiple, customizable and interchangeable templates correspond with multiple levels of functionality and define input and control buttons corresponding to active areas of the touchpad. A display such as an organic light emitting diode (OLED) provides interactive, color feedback. The touchscreen has a hinged connection to the touchpad and is pivotable to an open position to permit insertion and removal of the overlay templates, and is surrounded by a trim ring dam to prevent moisture intrusion. A light sensor is provided for detecting the ambient light level and adjusting the intensity of a backlight for faceplates of any color.

17 Claims, 7 Drawing Sheets

INTERACTIVE TOUCHPAD

BACKGROUND OF THE INVENTION

1. Field of the Invention

This invention relates to an improved touchpad for use in home audio/video system control, distribution and automation.

2. Description of Related Art

Keypads are used in homes for control of home systems such as audio/video (A/V), heating, ventilation and air conditioning (HVAC), security, etc. A typical keypad is hard wired for power and control, and is mounted on the wall with fixed hard buttons for input and a display for feedback. As functionality, feedback and portability of such devices increases, so does the price.

Current keypads offer a fixed level of control. Keypad configurations range from a greater number of small buttons with a greater degree of control or a lesser number of large buttons with a more limited degree of control. Keypads with a greater number of keys are often difficult to operate and are labeled by small text that is difficult to read, especially when not back-lit. Conventional keypads generally do not have the flexibility to add or delete buttons as needed.

Displays on conventional keypads are often difficult to read because of low resolution and low contrast ratios. Some conventional keypads offer only very limited feedback in the form of light emitting diodes (LEDs). Alternatively, some keypads utilize more flexible and customizable liquid crystal display (LCD) panels. However, LCD panels are expensive to manufacture and typically have a contrast ratio of only about 80. In addition, most keypad LCDs have an off-axis viewing angle limitation of about 45 degrees or less.

SUMMARY OF THE INVENTION

The present invention overcomes these drawbacks of the prior art and provides a touchpad with multiple, easily-selectable levels of control and changeable and customizable overlays. The touchpad has an organic light emitting diode (OLED) display with a superior contrast ratio and no viewing angle limitations. The result is a unique touchpad display that is attractive and readable from any angle.

Accordingly, one embodiment of the invention is an interactive touchpad. A touchscreen defines active areas responsive to contact. An overlay template is provided and is removably coupled to the touchscreen to define input and control buttons corresponding to the active areas of the touchscreen. A display is also provided in the interactive touchpad for providing feedback in response to contact with the touchscreen. The touchpad is further provided at least one additional overlay template removably couplable to the touchscreen and interchangeable with the overlay template removably coupled to the touchscreen. The at least one additional overlay template defines input and control buttons corresponding to the active areas of the touchscreen, wherein the input and control buttons defined by the at least one additional overlay template are different from the input and control buttons of the overlay template such that the overlay template and the at least one additional overlay template correspond to different levels of touchscreen functionality. The touchscreen is a resistive touchscreen comprising a glass panel and a polyester film or a capacitive touchscreen comprising two glass panels. The touchscreen has a hinged connection to the touchpad and is pivotable to an open position to permit insertion and removal of the overlay template. The display is an organic light emitting diode (OLED) having approximately 160 degrees of usable viewing angle and a contrast ratio of approximately 200. The touchscreen and the overlay template define a feedback area where feedback is provided by the display. The touchpad has a dimension compatible with mounting in a double gang junction box. The touchpad further comprises a trim ring surrounding the touchscreen, the trim ring defining a dam to prevent moisture intrusion into the space between the overlay and the touchscreen.

In another embodiment of the present invention, an interactive touchpad includes a touchscreen defines active areas responsive to contact. A display provides feedback in response to contact with the touchscreen. A backlight is provided and a light sensor for detecting an ambient light level and adjusting the intensity of the backlight in response is provided. The light sensor sets a maximum brightness value of the ambient room light when the light sensor is first activated and sets a minimum brightness value according to a predetermined offset value of the maximum brightness value. The interactive touchpad further includes a faceplate surrounding the touchscreen and the display, wherein the light sensor is provided behind a hole in the faceplate. An overlay is removably coupled to the touchscreen. At least one additional overlay is removably couplable to the touchscreen and is interchangeable with the overlay removably coupled to the touchscreen.

In yet another embodiment of the present invention, an interactive touchpad includes a touchscreen defining active areas response to contact and a display for providing feedback in response to contact with the touchscreen. An IR sensor and dual function IR sensor circuit provides a normal mode that produces a high gain IR signal and a learning mode that provides a low gain IR signal. The interactive touchpad can be programmed via a remote control device during the learning mode. An overlay is removably coupled to the touchscreen and the IR sensor is provided behind the overlay. The IR sensor operating in normal mode can receive a signal from up to 30 feet away from the IR sensor. The signal received by the IR sensor during the learning mode is amplified by a first amplification stage and then passed through a high impedance buffer and a high pass filter in the dual function IR sensor Other features and advantages of the invention will be apparent from the following detailed description, taken in conjunction with the accompanying drawings which illustrate, by way of example, various features of embodiments of the invention.

DETAILED DESCRIPTION OF THE INVENTION

Introduction

Figure 1A:
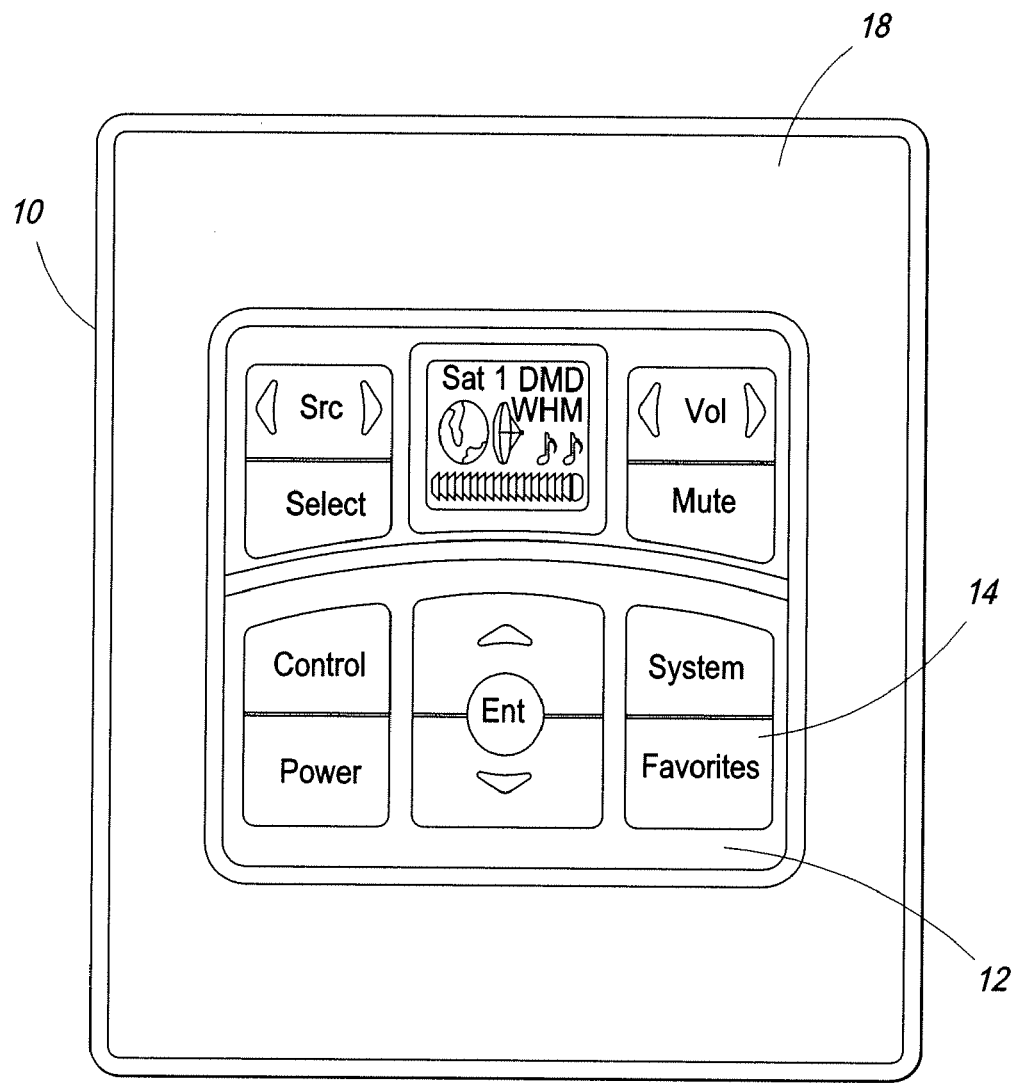
FIG. 1a is a front view of a touchpad according to the present invention with a basic overlay template.
Figure 1B:
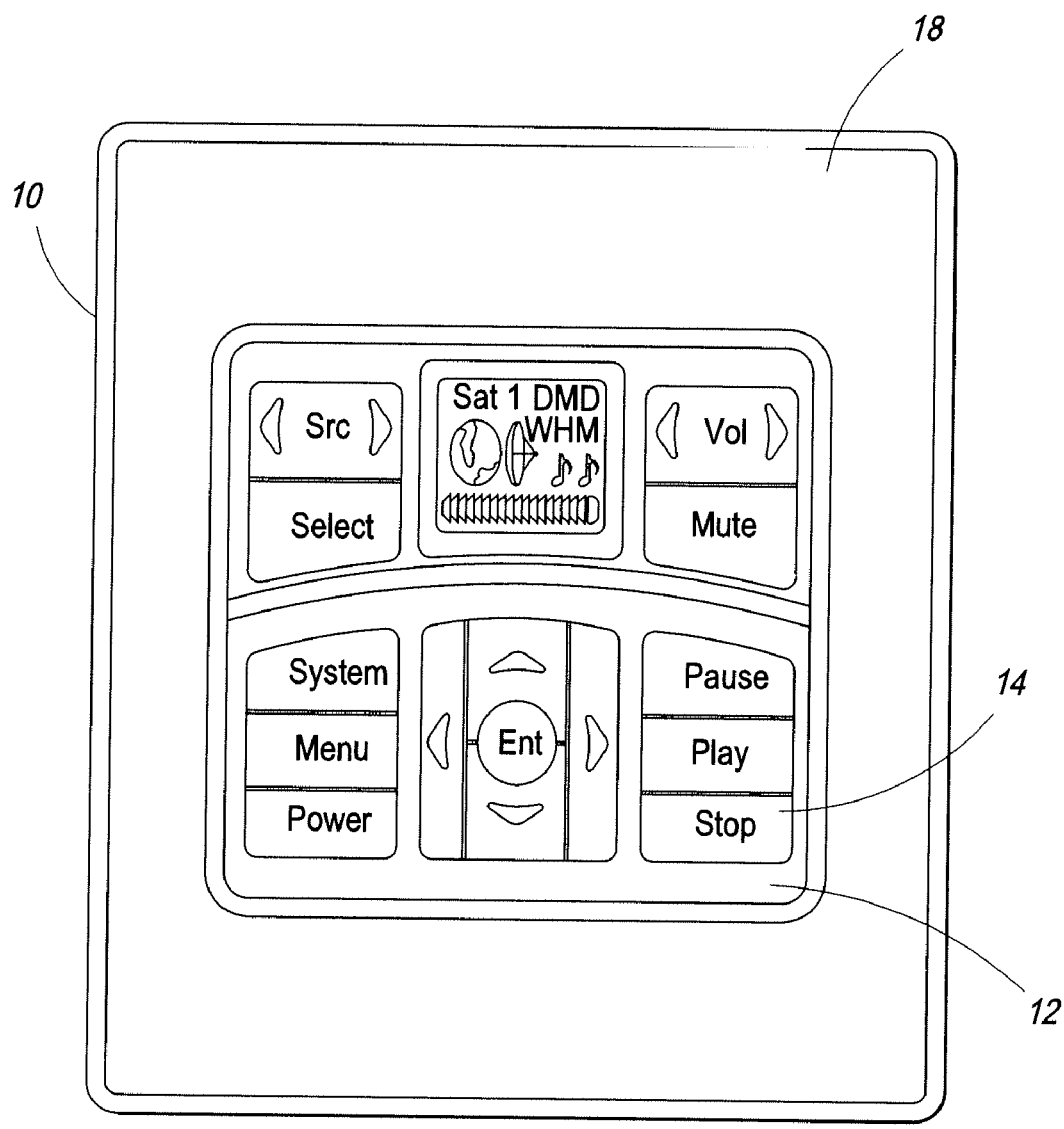
FIG. 1b is a front view of a touchpad according to the present invention with a moderate overlay template.
Figure 1C:
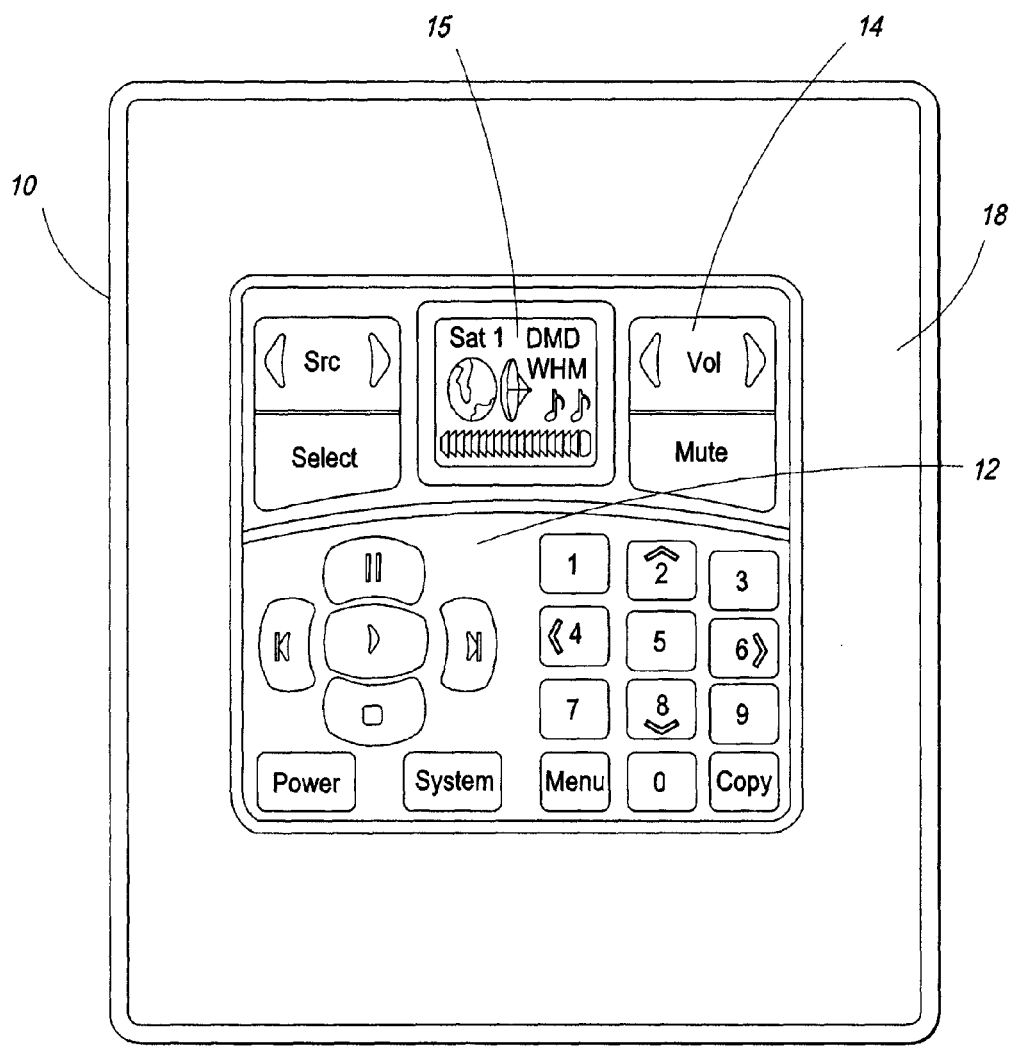
FIG. 1c is a front view of a touchpad according to the present invention with an advanced overlay template.

A film interactive touchpad ("FIT") 10 according to the present invention is illustrated in FIGS. 1a-1c and can be used in the control of home systems. Touchpad 10 is a double-gang, in-wall system controller that uses a touch overlay in lieu of hard buttons to perform all functions normally associated with a keypad. Source and system control icons and functions are printed on interchangeable backlit film transparencies or overlays. Icon and function names on the overlays correspond to active "hot spots" that issue a control command and give audible and/or visual feedback/confirmation to the user when pressed.

Multiple IR commands or sequences can be issued from a single press of any button on any template. An organic light emitting diode (OLED) provides source, system and programming feedback to the user. Programming is accomplished with software through a direct link from a computer to a USB or mini-USB download port 52 on the front of the unit, as well as from received IR commands and switch 56.

The overlays or transparencies are easily installed and available in a wide variety of configurations and various graphical themes to match any functional requirements and/or room decor. Three levels of complexity are available to customize each touchpad, from basic functionality to advanced system control.

Film interactive touchpad 10 utilizes a resistance touchscreen having a polyester plastic film suspended over a glass panel, which is placed over a changeable backlit overlay. A capacitive touchscreen may also be utilized. Depressing the polyester film with a finger allows the film to touch the glass panel underneath, generating a location signal that is read by the electronics. Each button location ("hot spot") is assigned an IR or RS-232 command that controls sources such as A/V equipment, home theater, HVAC systems, shades, lighting systems, security systems, fireplaces, etc. Each touchpad is custom-programmed to perform exactly the functions required for each individual home, room and/or system.

Detailed Description

FIGS. 1a-1c illustrate a film interactive touchpad 10 according to the present invention. In the embodiment described herein, three levels of functionality or complexity are available and are easily selectable by a switch or button 56 (FIG. 4) without the requirement of a computer to reprogram the pad. However, it should be understood that three levels is merely exemplary, and that more or less than three levels of functionality could be provided and is within the scope of this invention.

FIG. 1a shows a touchpad 10 overlaid with a template for basic functionality; FIG. 1b shows a touchpad 10 overlaid with a template for moderate functionality; and FIG. 1c shows a touchpad 10 overlaid with a template for advanced functionality. Touchpad 10 comprises an organic light emitting diode (OLED) 15 and backlight 12, above which is a changeable overlay 14 with defined buttons for input and control. A touchscreen 40 comprising a polyester film and a glass panel is above overlay 14 (see FIG. 3) and defines active areas or "hot spots". OLED display 15 and overlay 14 are surrounded and contained within a faceplate 18.

Depressing the polyester film with a finger allows the film to touch the glass panel underneath, generating a location signal that is read by electronics within touchpad 10. An audible "click" or other sound may be generated to confirm the button press, and may be accompanied by a visual indication as well. Each button location ("hot spot") is assigned an IR or RS-232 command that controls sources such as A/V equipment, HVAC systems, shades, lighting systems, security systems, fireplaces, etc. Each touchpad is custom-programmed to perform exactly the functions required for each individual home, room and/or system. Any button press may generate virtually unlimited IR command sequences.

OLED display 15 is self illuminating and has 160 degrees of usable viewing angle. In one embodiment, OLED 15 is a 4-line, 1.2" color OLED having a contrast ratio of approximately 200. Overlay 14 is back-lit by backlight 12 and is made of a material that provides superior clarity and readability. In one embodiment, overlay 14 is made of a marketing sign material such as duratrans/duraclear, which also has 160 degrees of usable viewing angle. The combination of these two components provides a bright, clear, high-contrast and very readable device with no limits on viewing angle.

The provision of basic (FIG. 1a), moderate (FIG. 1b) and advanced (FIG. 1c) levels of functionality provides the flexibility of changing the functionality by changing the overlay 14 without any requirement to reprogram touchpad 10. Some users may want just a basic configuration, with only enough buttons to get to their favorite music or show, while other users will want an advanced configuration with complete systems control. In one embodiment, the basic configuration has 13 buttons; the moderate configuration has 17 buttons; and the advanced configuration has 25 buttons. By contrast, while an LCD panel of the prior art can be programmed to any level of functionality, they are expensive and the reprogramming must be done by a computer in communication with the keypad.

A touchscreen in combination with an overlay allows a user to create different looks and button combinations just by changing the overlay. For example, with 36 different overlays, multiplied by the three levels of overlays, and seven colors and two styles of faceplates, almost 1600 unique touchpads can be created to fit any user's taste, without the need for a computer to reprogram the device, although a computer may still do so.

The overlays can be custom designed, i.e., a user can select his/her own background for the overlay. For instance, a user could provide a digital file containing the background (vacation, family photos, sporting event photos, etc.), along with an indication of the function level (basic, moderate, advanced) and the style of button. In this manner, each room of a home could have a custom overlay selected and designed by the user.

The OLED display area of touchpad 10 includes a feedback area OLED 15 (FIG. 1c) that provides feedback information depending on the function currently selected or the operation being performed. For example, feedback area 15 may indicate the name and/or graphic of a source (i.e. satellite, cable, game, tuner, etc.), system status, etc. Feedback area 15 may have virtually limitless indicators, depending on the type of system and controls provided by touchpad 10. The OLED color options may match the motif and color palette of the overlay.

Figure 2:
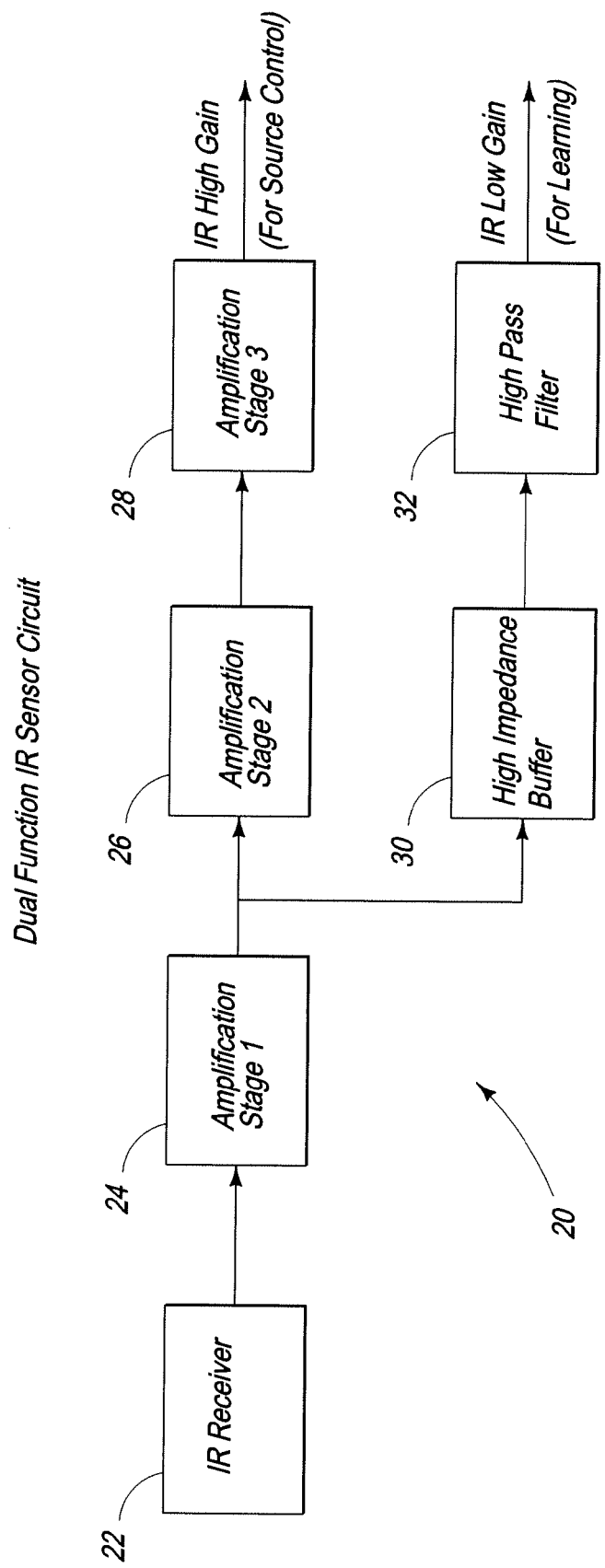
FIG. 2 is a block diagram of a dual function IR sensor circuit according to the present invention.

Touchpad 10 includes an infrared (IR) sensor that is used both to teach touchpad 10 IR commands as well as for normal IR control of touchpad 10 by a remote control device. Normal operation with a remote can be 30 feet or more from keypad 10. To accomplish this, touchpad 10 incorporates a dual function IR sensor circuit 20 (FIG. 2).

Each signal received by IR receiver or sensor 22 is amplified by a first amplification stage 24. When touchpad 10 is in a normal operation mode (i.e., when the remote may be 30 or more feet away), the signal is also amplified by a second amplification stage 26 and a third amplification stage 28 to provide a high gain IR signal for source control. By contrast, when keypad 10 is in learning mode, the remote will typically be less than one foot away and such amplification is not needed and may corrupt the signal. So, in a learning mode, the signal is not amplified again but is instead fed to a high impedance buffer 30 and a high pass filter 32 to provide a low gain IR signal for the learning mode. A learning mode in the IR sensor 22 is particularly useful in allowing the touchpad to be programmed via the remote such that a computer is not required to program touchpad 10 and allows the remote to carry out the programming.

Figure 3:
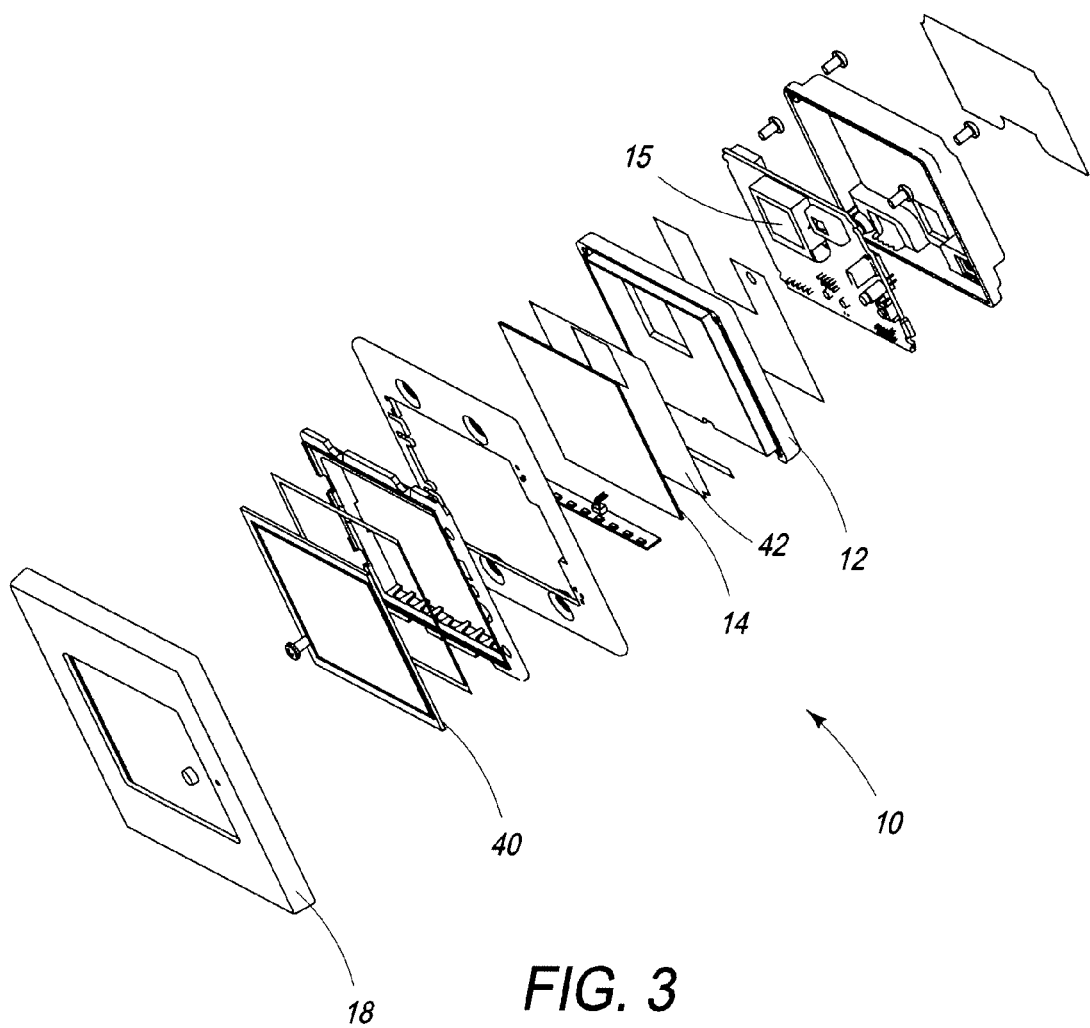
FIG. 3 is a disassembled perspective view showing components of a touchpad according to the present invention.

The IR sensor is behind the touch screen, overlay, diffuser, backlight and reflector to provide an IR sensor that is invisible to the user and that allows control buttons to be on top of the IR sensor. The placement of the IR sensor results in superior appearance and more space for control buttons. FIG. 3 is a disassembled view illustrating the various components of touchpad 10, including faceplate 18, touchscreen 40, overlay 14, diffuser 42, backlight 12, and other components.

It is important that the entire assembly of touchpad 10 fit into a standard electrical junction box, such as a "double gang" box. Generally speaking, such boxes are limited in room, which in turn limits the display on the user interface. LCD panels are very small for this reason. Many conventional keypads are not able to fit into a double gang box. However, some embodiments of the present invention may provide a larger active touch area in a smaller package that fits into a double gang box.

Figure 4:
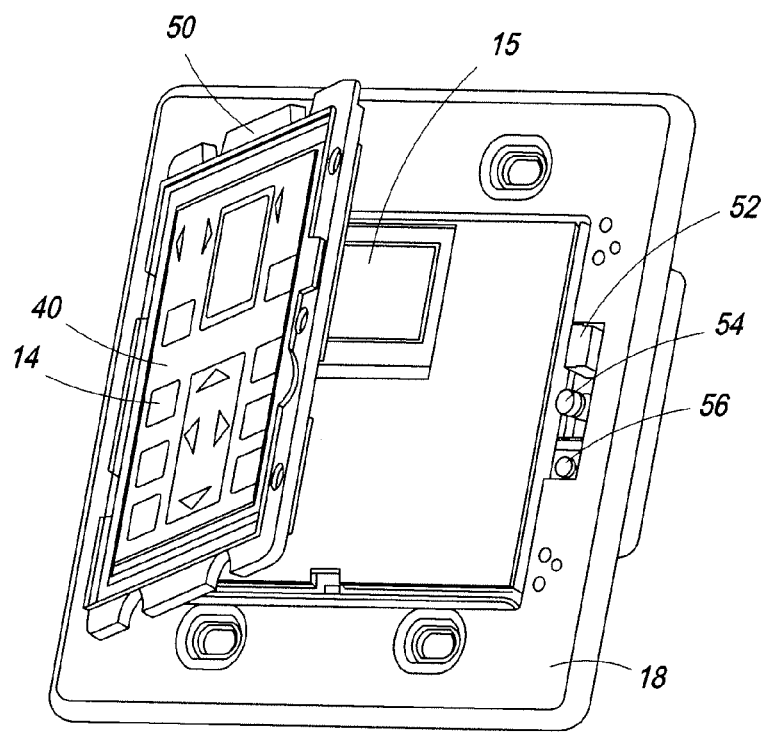
FIG. 4 is a perspective view of a touchpad of the present invention with a trim ring opened.
Figure 5:
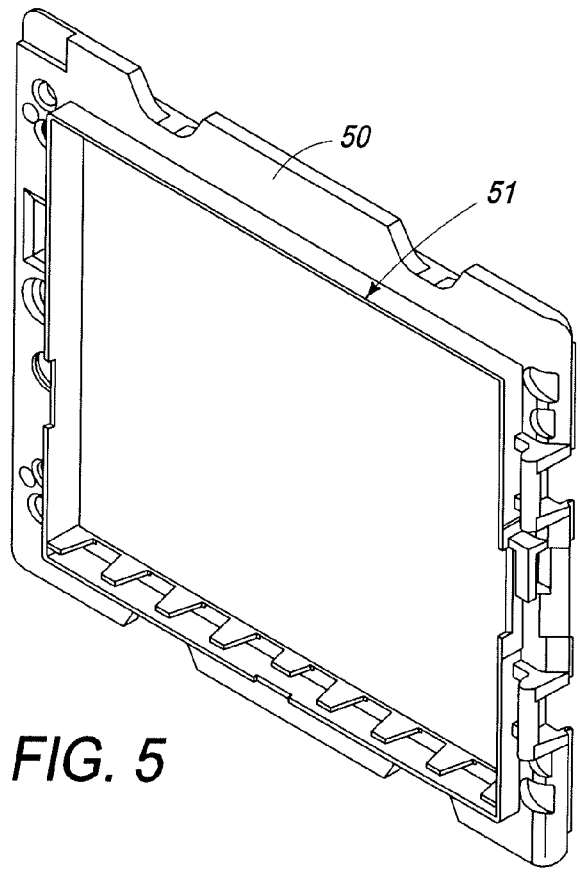
FIG. 5 is a perspective view of a trim ring having a trim ring moisture dam according to the present invention.

The changeable overlay design of the present invention is provided with a trim ring 50 having a trim ring dam 51 that keeps moisture out of the assembly and prevents moisture from wicking into the space between the overlay and touch screen. Trim ring 50 is illustrated in FIG. 4 surrounding touch screen 40 and overlay 14, and is depicted in isolation and with a better view of dam 51 in FIG. 5. As shown, trim ring 50 is hinged to faceplate 18 and defines a hinged glass door that may be pivoted up and opened to allow for easy insertion and removal of an overlay.

Figure 6:
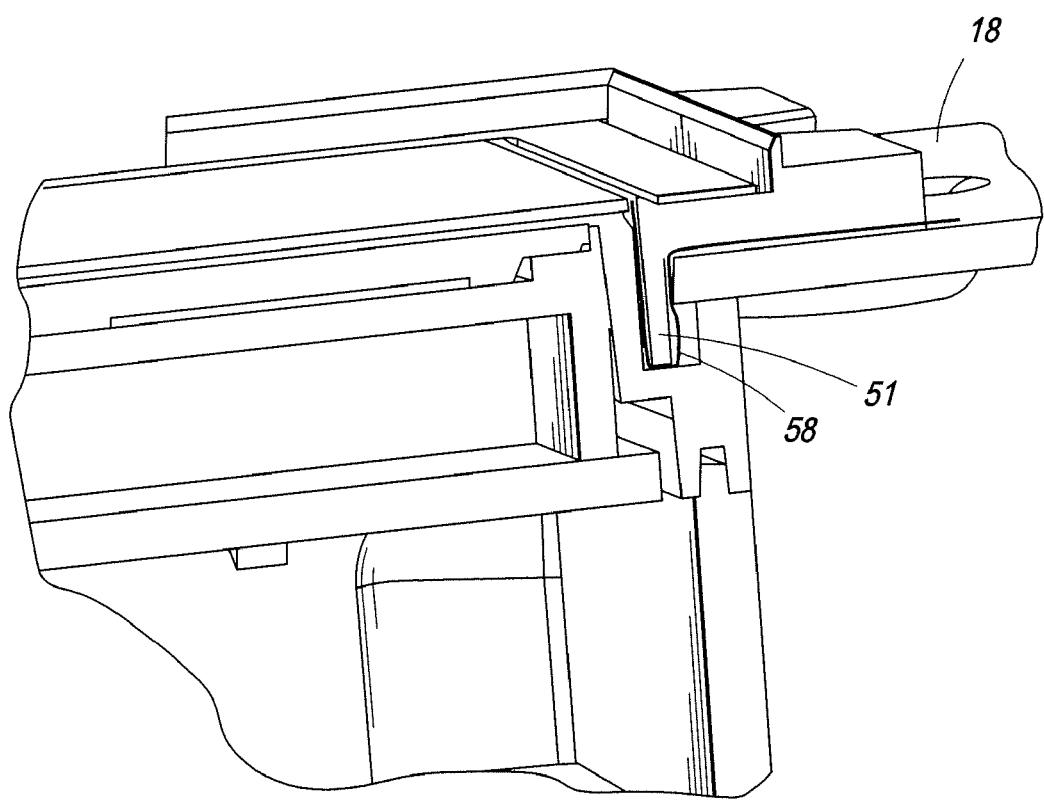
FIG. 6 is a section view showing the orientation of the trim ring dam relative to the touchpad.

Also shown in FIG. 4 is a USB or mini-USB download port 52, a light sensor 54 and a switch 56 for setting the keypad to one of the three levels corresponding to the selected overlay. Light sensor 54 may be a brightness-adjusting light sensor that senses the ambient light level in the room and adjusts backlighting intensity accordingly. A small hole is provided in faceplate 18 for light to pass through onto the light sensor 54. When light sensor 54 is first activated, a reading of the ambient room light is taken and is set as a maximum brightness value or full backlight. Then, a fixed offset value is used to determine a minimum brightness based on the maximum brightness value. In this manner, the light sensor 54 can properly determine and adjust the backlight for different colored faceplates that would otherwise produce inaccurate backlight conditions. For example, when a black faceplate is provided instead of a white faceplate, this feature causes the light sensor behind the faceplate to sense a bright room as dark and dimming the backlight. FIG. 6 is an exploded view showing that trim ring dam 51 nests within back light groove 58 to keep out water or moisture traveling a path along face plate 18.

Touchpad 10 may have various system interconnects and ports, such as an RJ45 for system interconnection, a system IR output and a local component IR control output. The local component IR output or emitter may be used, for example, to control devices such as TV or DVD players located in the same room as the touchpad. An IR input terminals for connection of an external IR sensor to the touchpad is provided. Typically, a plasma-friendly IR sensor (such as, for example, an ELAN IRS8EP is placed near a TV, or an auxiliary sensor is placed in an area more convenient than the location of the touchpad. A sense port or motion sensor may be provided to provide such automated actions as system power on, drapes closed, lights dimmed, etc.

Touchpad 10 is easily programmable via software such as ELAN VIA! TOOLS®. In one embodiment, a standard USB to mini-USB cable is attached between mini-USB port 52 and a user's PC. The connection between a PC and one touchpad may be used to sequentially program all other touchpads in the system. The programming software may include functionality, for example, enabling a user to add a keypad to a system; to select a motif and a level of functionality; to select and name A/V input sources and icons; program buttons and macros; enable and disable particular features; "auto" populate system IR commands; and transfer commands from one keypad or system to another.

The embodiments of the present invention are not limited to an OLED display and can be used with an LCD, LED or other display type. Furthermore, the embodiments of the present invention are not limited to a resistive touch screen including a polyester film and glass panel.

The particular embodiments of the invention described in this document should be considered illustrative, rather than restrictive. Modification to the described embodiments may be made without departing from the spirit of the invention as defined by the following claims.

We claim:

1. An interactive touchpad comprising:
   a touchscreen defining active areas responsive to contact;
   an overlay template removably coupled to the touchscreen and defining input and control buttons corresponding to the active areas of the touchscreen;
   a display for providing feedback in response to contact with the touchscreen; and
   an IR sensor and dual function IR sensor circuit providing a normal mode that produces a high gain IR signal during a normal operation and a learning mode that produces a low gain IR signal during a learning operation, wherein the signal received by the IR sensor during the learning mode is amplified by a first amplification stage and then passed through a high impedance buffer and a high pass filter in the dual function IR sensor circuit to provide the low gain IR signal.

2. An interactive touchpad as claimed in claim 1, and further comprising:
   at least one additional overlay template removably couplable to the touchscreen and interchangeable with the overlay template removably coupled to the touchscreen.

3. An interactive touchpad as claimed in claim 2, wherein the at least one additional overlay template defines input and control buttons corresponding to the active areas of the touchscreen, wherein the input and control buttons defined by the at least one additional overlay template are different from the input and control buttons of the overlay template such that the overlay template and the at least one additional overlay template correspond to different levels of touchscreen functionality.

4. An interactive touchpad as claimed in claim 1, wherein the touchscreen is a resistive touchscreen comprising a glass panel and a polyester film.

5. An interactive touchpad as claimed in claim 1, wherein the touchscreen is a capacitive touchscreen comprising two glass panels.

6. An interactive touchpad as claimed in claim 5, and further comprising a trim ring surrounding the touchscreen, the trim ring defining a dam to prevent moisture intrusion into the space between the overlay and the touchscreen.

7. An interactive touchpad as claimed in claim 1, wherein the touchscreen has a hinged connection to the touchpad and is pivotable to an open position to permit insertion and removal of the overlay template.

8. An interactive touchpad as claimed in claim 1, wherein the display is an organic light emitting diode (OLED) having approximately 160 degrees of usable viewing angle.

9. An interactive touchpad as claimed in claim 1, wherein the display is an organic light emitting diode (OLED) having a contrast ratio of approximately 200.

10. An interactive touchpad as claimed in claim 1, wherein the touchscreen and the overlay template define a feedback area where feedback is provided by the display.

11. An interactive touchpad as claimed in claim 1, wherein the touchpad has a dimension compatible with mounting in a double gang junction box.

12. An interactive touchpad as claimed in claim 1, and further comprising:
   a backlight; and
   a light sensor for detecting an ambient light level and adjusting the intensity of the backlight in response, wherein the light sensor sets a maximum brightness value of the ambient room light when the light sensor is first activated and sets a minimum brightness value according to a predetermined offset value of the maximum brightness value.

13. An interactive touchpad as claimed in claim 12, and further comprising:
   a faceplate surrounding the touchscreen and the display;
   wherein the light sensor is provided behind a hole in the faceplate.

14. An interactive touchpad as claimed in claim 13, further comprising:
   at least one additional overlay removably couplable to the touchscreen and interchangeable with the overlay removably coupled to the touchscreen.

15. An interactive touchpad as claimed in claim 1, wherein the interactive touchpad can be programmed via a remote control device during the learning mode.

16. An interactive touchpad as claimed in claim 1, wherein the IR sensor is provided behind the overlay template.

17. An interactive touchpad as claimed in claim 1, wherein the IR sensor operating in normal mode can receive a signal from up to 30 feet away from the IR sensor.

* * * * *